(12) United States Patent
Fomison et al.

(10) Patent No.: US 8,511,057 B2
(45) Date of Patent: Aug. 20, 2013

(54) LUBRICANT SCAVENGE ARRANGEMENT

(75) Inventors: Neil R. Fomison, Derby (GB); Marc Tittel, Derby (GB)

(73) Assignee: Rolls-Royce PLC, London (GB)

( * ) Notice: Subject to any disclaimer, the term of this patent is extended or adjusted under 35 U.S.C. 154(b) by 1007 days.

(21) Appl. No.: 12/461,621

(22) Filed: Aug. 18, 2009

(65) Prior Publication Data
US 2010/0058729 A1 Mar. 11, 2010

(30) Foreign Application Priority Data

Sep. 11, 2008 (GB) .................................. 0816562.3

(51) Int. Cl.
*F02C 7/06* (2006.01)
*F02G 3/00* (2006.01)
*F01D 25/16* (2006.01)
*F01D 25/18* (2006.01)

(52) U.S. Cl.
USPC ................. 60/39.094; 60/39.08; 184/6.11

(58) Field of Classification Search
USPC .................... 184/6.11; 60/39.08, 39.094
See application file for complete search history.

(56) References Cited

U.S. PATENT DOCUMENTS

| | | | | |
|---|---|---|---|---|
| 3,045,778 A | * | 7/1962 | Mosbacher | 184/6.23 |
| 3,940,191 A | | 2/1976 | Tomioka et al. | |
| 5,150,769 A | * | 9/1992 | Major et al. | 184/31 |
| 5,489,190 A | * | 2/1996 | Sullivan | 415/175 |
| 5,584,650 A | * | 12/1996 | Redmond et al. | 415/55.5 |
| 7,124,857 B2 | * | 10/2006 | Gekht et al. | 184/11.2 |
| 7,278,516 B2 | * | 10/2007 | Zalewski et al. | 184/6.5 |
| 7,296,398 B2 | * | 11/2007 | Moniz et al. | 60/268 |
| 7,387,445 B2 | * | 6/2008 | Swainson | 384/462 |
| 7,455,150 B1 | * | 11/2008 | Gekht et al. | 184/11.2 |
| 2003/0140888 A1 | | 7/2003 | Tanaka et al. | |
| 2006/0037302 A1 | * | 2/2006 | Peters et al. | 60/39.08 |
| 2008/0022964 A1 | | 1/2008 | Reustle | |
| 2008/0110699 A1 | * | 5/2008 | Munson | 184/6.11 |
| 2008/0110813 A1 | * | 5/2008 | Munson | 210/167.04 |

FOREIGN PATENT DOCUMENTS

| | | |
|---|---|---|
| EP | 1 923 541 A2 | 5/2008 |
| GB | 14820 | 10/1915 |
| GB | 2 235 725 A | 3/1991 |
| JP | A-57-195918 | 12/1982 |

OTHER PUBLICATIONS

1999 Ford Expedition Automatic Transmission Pan.*
Search Report issued in European Application No. 09 25 2026 dated Mar. 21, 2011.

* cited by examiner

*Primary Examiner* — Ehud Gartenberg
*Assistant Examiner* — Karthik Subramanian
(74) *Attorney, Agent, or Firm* — Oliff & Berridge, PLC

(57) ABSTRACT

There is disclosed a lubricant scavenge arrangement provided on a chamber having an outer wall and configured to house a lubricated rotative component for rotation about an axis. The scavenge arrangement comprises: a substantially elongate channel provided in a substantially arcuate region of the wall, the channel being open to the chamber over substantially its entire length between an inlet end and an outlet end, said inlet end and said outlet end being angularly spaced apart around said longitudinal axis. The scavenge arrangement is particularly suited to use on bearing chambers in gas turbine engines.

23 Claims, 6 Drawing Sheets

LUBRICANT SCAVENGE ARRANGEMENT

The present invention relates to a lubricant scavenge arrangement, and more particularly to a lubricant scavenge arrangement provided on a chamber having an outer wall and configured to house a lubricated rotative component. The arrangement of the invention is intended to be particularly applicable to chambers such as gearboxes, crankcases, or bearing chambers on gas turbine engines.

Gas turbine engines are known to use high-speed bearing arrangements which are provided within bearing chambers and which must be very carefully cooled and lubricated. The bearings are thus provided with a continuous supply of liquid lubricant in the form of oil, which must then be led away (or "scavenged") from the bearing chamber, usually to be cooled before being recirculated back to the bearing. It is important that the oil is properly scavenged from the bearing chamber because otherwise oil shed from the bearing as it rotates can pool in the bottom of the chamber. Problems arising from oil pooling in the bottom of the chamber include: the bearings becoming partially submerged in the oil, the hot oil being re-ingested into the bearings (both of which result in increased heat generation and oil degradation), or oil leakage from the chamber.

Previously proposed arrangements for the scavenge of cooling/lubricating oil from a gearbox, bearing chamber or crankcase often rely on the force of gravity or the momentum of the oil to bring the oil to the lowest point in the system where the oil is then removed. These types of scavenge arrangements typically comprise an inlet to one or more scavenge pipes or passages forming part of the oil return system. The scavenge arrangement may be driven by a pump and/or by the pressure excess in the chamber (i.e. making use of the pressure within the chamber to blow the oil down the scavenge pipe). The capacity of the scavenge arrangement is typically designed to exceed the volume of oil supplied to the chamber, with the excess capacity being made up of air drawn into the chamber from the surroundings. This airflow assists with reducing the likelihood of oil loss from the chamber seals.

As the rotative components within the chamber rotate, oil is shed from the rotative components and a large proportion of it becomes caught on the walls of the chamber in the form of relatively high-speed films as a consequence of the initial velocity imparted by the rotating machinery and of the shearing effect of induced airflows acting on the surface of the film once it forms. This initial velocity is responsible for bringing the majority of the oil to the vicinity of the offtake system in high speed, high pressure environments. Only a relatively small proportion of the oil is actually driven to the offtake system solely under the effect of gravity.

FIG. 1 illustrates one type of known scavenge system which comprises a chamber 1 within which a rotative component 2 is mounted for rotation about a longitudinal axis 3 of the chamber. Used oil 4 is shed from the rotative component 2 and forms a film 5 which flows downwardly into a space 6 defined by a sump 7 provided at the lowest point of the chamber. From the sump, the oil is removed via a scavenge pipe 8 and recirculated. Within the space 6 of the sump, the momentum of the oil is reduced through collisions with the walls and through energy exchange with static oil already present within the space. The capture space 6 of the sump 7 may be provided with a lid 9 (sometimes referred to as a windage shield or baffle) which is intended to protect the oil within the sump from re-entrainment by the rotating airflow in the main chamber, which would increase oil residence time, and to prevent excess drag on the rotatives due to oil-splashing.

With this type of prior art arrangement, the depth and volume requirements of the sump increase as the energy of the incoming oil increases. Space can often be limited, particularly in the case of an aero gas turbine engine and if sufficient space is not available to accommodate an appropriate design, then oil may not be completely caught by the offtake, in which case the oil can re-emerge into the main bearing chamber or gearbox. This is undesirable as it may result in the rotating components dipping into the oil, oil becoming re-ingested into bearings, or oil leaking through the chamber seals.

Another known type of scavenge arrangement is the scoop design as illustrated generally in FIG. 2, which shows a vertical section through a cylindrical bearing chamber 1 around a horizontal shaft 2 supported on a bearing for rotation about the axis 3. In this arrangement a scoop 10 is provided at the bottom of the chamber, and which has an opening 11 arranged so as to be generally tangential to the inner wall of the chamber. The scoop 10 is intended to accommodate an oil film 5 approaching the offtake from a specific direction (generally assumed to be determined by the direction of rotation of the machinery).

The flow approaching the scoop opening 11 (positioned at or close to bottom-dead-centre (BDC) of the chamber) is designated as the 'primary flow' (indicated generally by arrow 12 in FIG. 2) and is driven by the rotation of the shaft and the bearing. Oil which fails to enter the opening 11 will not be efficiently removed, potentially leading to the undesirable results described above. Oil which is flung off the rotative components at an angular position past the scoop opening 11 but before top-dead-centre (TDC), and which does not possess sufficient energy to move pass past TDC (and hence contribute to the 'primary' flow in a clockwise direction as illustrated) contributes to a 'counter' flow indicated generally at 13 in FIG. 2. This counter flow of oil will collapse under the effect of gravity and approach the scoop from the 'reverse' direction. A secondary flow of used oil featuring a radial velocity component may also exist on the end walls of the chamber, but in most situations this secondary flow makes up only a small proportion of the total chamber oil flow and so presents less of a problem.

In some circumstances, the airflow induced by the rotating components will exert sufficient surface shear on the surface of the counter flow oil 13 that a substantial volume of oil may be effectively trapped within the counter flow system (usually within the first 60° past bottom-dead-centre) leading to undesirably long oil-residence times within the chamber. This is particularly undesirable in high temperature environments where the likelihood of the oil thermally degrading will increase with increased residence time.

By its nature, a scoop offtake of the type shown in FIG. 2 must be directional (i.e. normally aligned with the primary flow 12) and is therefore poorly suited for capture of the counter flow 13 which is effectively 'shut out' and which gathers in a pool 14, unable to enter the scoop.

Another serious disadvantage with the scoop-type arrangement is that oil films in high speed applications (despite the significance of surface tension and viscosity effects) behave in a manner similar to supercritical hydraulic flows (i.e. shallow water flows with Froude number greater than 1). A high speed film entering the opening 11 will be extremely susceptible to deceleration through strong, unsteady, hydraulic jump type waves initiated within the scoop itself by any adverse pressure gradient caused, for instance, by changes in direction or changes in flow area. Strong waves of this type are undesirable due to their unsteady turbulent behaviour (which cannot be reliably predicted) and the characteristic large and rapid increase in film thickness, which is often accompanied by air entrainment (effectively reducing the density of the film and thereby increasing its 'bulk').

It has been found through experiment that a process similar to the un-starting of a supersonic air intake with internal deceleration can occur in the scoop-type arrangement of FIG. 2. The wave system by which the two-phase flow decelerates in the scoop, although it might initially form within the scoop, has been found to have a tendency to move back out of the opening 11 and into the chamber if the internal deceleration process is not carefully controlled within the scoop.

In the analogous case of the supersonic air intake, techniques to achieve controlled internal deceleration via a combination of either shock or isentropic compressive waves are well known. However, the design of internal deceleration systems for supercritical two-phase flows is still problematic. If the oil deceleration waves move out of the scoop, and the scoop is not of sufficient height to swallow the resultant wave, then a proportion of the approaching primary flow 12 will fail to be captured by the scoop opening leading to a further contribution to the 'counter' flow and the potentially undesirable effects described above. Furthermore, the resulting large scoop dimensions may generate a strong disturbance to the air flow within the chamber/gearbox with possible effects for windage heat generation levels.

US 2006/0037302 discloses a modified form of scoop-type arrangement in which a perforated lid is provided over a region where the primary and counter flows mix before entering the scavenge pipe. The intention of this perforated lid is to permit entry of the counter flow to the scavenge pipe, and so the perforations are unable also to spill primary flow from the scoop to assist in wave capture. Additionally, the perforations in the lid, which take the form of regularly spaced holes, are generally undesirable in high temperature applications where they may promote the occurrence of local recirculation zones where oil degradation products may form.

It is therefore an object of the present invention to provide an improved lubricant scavenge system.

Accordingly, a first aspect of the present invention provides a lubricant scavenge arrangement on a chamber having an outer wall and configured to house a lubricated rotative component for rotation about an axis, the scavenge arrangement comprising: a substantially elongate channel provided in a substantially arcuate region of the wall, the channel being open to the chamber over substantially its entire length between an inlet end and an outlet end, said inlet end and said outlet end being angularly spaced apart around said axis, wherein, in certain embodiments, the channel is configured so as to have a bottom surface which is banked so as to make an acute angle to the adjacent region of the chamber wall, and the angle at which the bottom surface of the channel is banked preferably varies along the length of the channel.

In the preferred arrangement, the inlet end of the channel precedes the outlet end in the direction of rotation of the rotative component within the chamber.

Preferably, the inlet end and the outlet end are angularly spaced apart by 50° to 100°.

The channel is preferably tapered such that its width, measured in a direction substantially parallel to the axis, narrows towards the outlet end.

In one embodiment the width of the channel at the inlet end is substantially equal to the length of the chamber, whilst in another embodiment the width of the channel at the inlet end is less than the length of the chamber.

The channel preferably has a substantially concave sidewall.

The concave sidewall may be configured to have regions of zero curvature at the inlet end and at the outlet end.

The concave sidewall may be configured so as to have a cosine profile.

In a preferred arrangement, a tangent to the concave sidewall at the outlet end of the channel makes an angle of approximately 30° to a tangent to the concave sidewall at the inlet end of the channel.

The channel may have a substantially convex sidewall, and in a preferred arrangement, the concave side wall is provided along one side of the channel with the convex side wall being provided along the opposite side of the channel.

Preferably, the outlet end of the channel is laterally offset with respect to the inlet end of the channel.

In a preferred arrangement, the depth of the channel, as measured in a substantially radial direction with respect to the axis, increases with movement along the channel from the inlet end to the outlet end.

The ratio of channel depth in the region of the outlet end to channel depth in the region of the inlet end is preferably approximately 4.

In a preferred arrangement the bank angle tends to zero at the inlet end and the outlet end of the channel.

Preferably, the outlet end of the channel is directly fluidly connected to a funnel recess provided in the chamber wall, the funnel recess having a substantially radially outwardly directed funnel-outlet for fluid connection to a scavenge pipe.

In a preferred arrangement the funnel recess is open to the chamber.

Optionally, the funnel-outlet is laterally offset relative to the outlet end of the channel.

Preferably, the funnel recess takes the form of a substantially circular bowl.

In a preferred arrangement the maximum diameter of the bowl is approximately three times the diameter of the funnel-outlet.

According to another aspect of the invention there is provided a gas turbine engine comprising a chamber having a lubricant scavenge arrangement as defined above.

In one such gas turbine engine arrangement, the chamber houses a pair of lubricated rotative components mounted for contra-rotation about an axis of the chamber, and the lubricant scavenge arrangement comprises a pair of said channels, each channel being associated with a respective rotating component, and being oriented such that its inlet end precedes its outlet end in the direction of rotation of the respective rotative component.

According to another aspect of the present invention, there is provided a bearing chamber for a gas turbine engine, the bearing chamber being configured to house a lubricated bearing for rotation about an axis and comprising a lubricant scavenge arrangement, wherein the lubricant scavenge arrangement comprises a swirl chamber in direct fluid communication with the bearing chamber, the swirl chamber extending outwardly from the bearing chamber in an axial direction and having an outlet for fluid connection to a scavenge pipe, the outlet extending substantially radially relative to the axis and being offset axially from the bearing chamber.

So that the invention may be more readily understood and so that further features thereof may be appreciated, embodiments of the invention will now be described, by way of example, with reference to the accompanying drawings in which.

Figure 1:
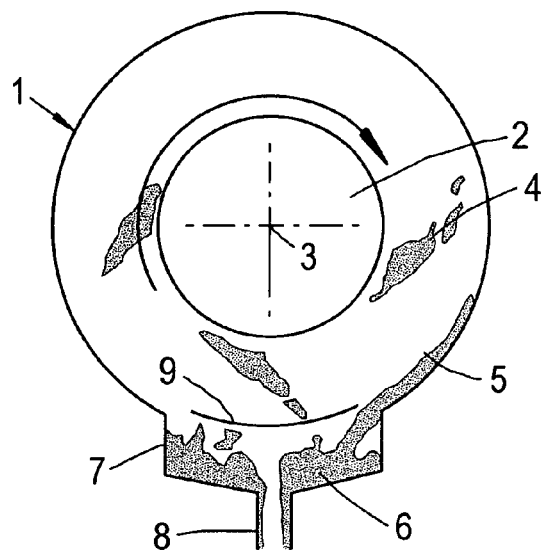
FIG. 1 is a transverse cross-sectional view of a chamber incorporating a prior art oil scavenge arrangement (discussed above)
Figure 2:
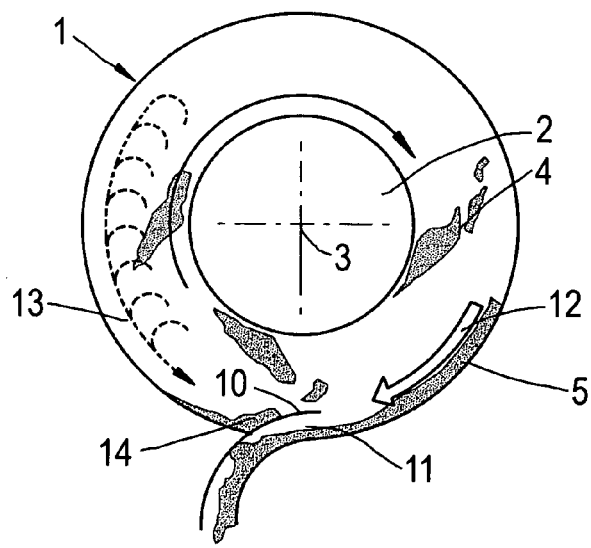
FIG. 2 is a transverse cross-sectional view of a chamber incorporating another type of prior art oil scavenge arrangement (discussed above)

As will be explained in more detail below, the lubricant scavenge arrangement of preferred embodiments of this invention employ a number of features which are intended to decelerate the primary flow of oil shed from the rotative components in a controlled manner using a scavenge channel which is open to the interior volume of the chamber housing the rotative components. This allows the primary flow to be carefully decelerated external to any closed section of the scavenge arrangement, such as the scavenge pipe, as opposed to the internal deceleration within the narrow scoop of the prior art arrangement illustrated in FIG. 2, or the chaotic external deceleration of the gravity-type arrangement illustrated in FIG. 1. The external nature of the deceleration and capture process also ensures entry of the counter flow into the scavenge system is as unrestricted as possible.

Figure 3:
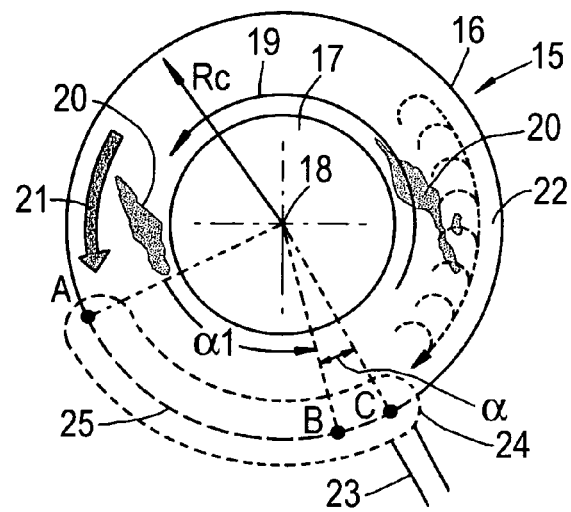
FIG. 3 is a schematic transverse cross-sectional view of a chamber incorporating a lubricant scavenge arrangement in accordance with the present invention.

Referring initially to FIG. 3 of the accompanying drawings, there is illustrated a gas turbine bearing chamber 15 having a generally cylindrical outer wall 16 (of radius $R_c$) which houses a rotative component in the form of a shaft 17. The shaft 17 is mounted for rotation on a high-speed bearing about the longitudinal axis 18 of the housing. As will be appreciated, the shaft 17 illustrated in FIG. 3 is mounted for rotation in an anti-clockwise direction, as indicated by arrow 19.

The shaft 17 is supplied with a liquid lubricant in the form of oil in a manner known per se and which therefore need not be described in more detail. As already described above in the context of the prior art arrangements, as the shaft 17 rotates at high speed within the chamber 15, used oil 20 is shed from the shaft. The primary flow of this oil is indicated generally by arrow 21 in FIG. 3 and takes the form of a thin film on the inner surface of the chamber wall 16, moving in the direction indicated. The counter flow of oil is indicated generally by arrow 22 in FIG. 3 and moves in the opposite direction.

As will now be described, the chamber 15 is provided with a scavenge system which basically comprises two distinct sections, as indicated schematically in FIG. 3. The section shown to extend around the arcuate region of the wall 16 between points A and B is designed to decelerate the supercritical primary flow using a channel which is open to the interior volume of the chamber and which is designed for the appropriate 'equivalent' Froude number of the flow. The section shown to extend between points B and C is designed to redirect the resulting subcritical primary flow exiting section A-B into a scavenge pipe 23 via an inlet provided in the region of the wall indicated generally at 24. In FIG. 3, α1 denotes the angular extent of the supercritical deceleration section A-B, and α2 denotes the angular extent of the subcritical/scavenge pipe inlet section B-C.

In most high-speed arrangements, the primary flow 21 contains the majority of the oil shed from the rotative components. Experimental studies on geometries representative of gas turbine bearing chambers have shown that, assuming oil supply is sufficient, oil flung from the rotative components stabilises relatively rapidly to form a film on the inner surface of the chamber wall with a thickness in the typical range of 1 mm to 2 mm, and having a bulk velocity in the typical range 1 to 2 m/s. This film of oil is often relied upon to cool the bearing chamber structure.

Furthermore, experimental studies have also shown that despite the effects of viscosity and surface tension, the bulk film behaviour can be approximated by shallow water wave theory, but corresponding to a flow at a far lower supercritical Froude number than a straightforward calculation would suggest, where Froude number for shallow water theory is taken as $$Fr = \frac{U}{\sqrt{d \cdot g^*}}$$

And where:
U=bulk velocity
g*=effective component of acceleration normal to the chamber wall (i.e. resultant of gravity component normal to wall and the centrifugal acceleration associated with the curvature of the chamber wall)
d=film thickness normal to the wall For typical oil films having the parameters indicated above (namely a thickness of 1-2 mm and a bulk velocity of 1-2 m/s), it has been found that the flow behaviour of the primary film 21 resembles that predicted using hydraulics theory at an 'equivalent' Froude number in the range approximately 3 to 4 (rather than approximately 10 which would be suggested by the basic flow parameters).

With this information, elements of, for example supercritical spillway design can be employed to design a scavenge channel having a geometry which will bring about a smooth deceleration to critical (Froude number of unity) conditions. The angular position of point A is selected according to the rate at which the deceleration to critical conditions is to be achieved. As will be appreciated, the greater the separation of A and B (i.e the larger αl is), the less rapidly the primary flow 21 will be decelerated and so the likelihood of strong waves being formed will also be reduced. It has been found through experiment that a circumferential separation between A and B of roughly equal to the chamber radius $R_c$ gives satisfactory results, meaning that the scavenge channel (described below) of the present invention preferably has a length approximately equal to $R_c$.

Once the similarity to hyperbolic open channel hydraulics flow (albeit at a reduced 'equivalent' Froude number) is recognised as explained above, a number of possible approaches can be used to design a scavenge arrangement in accordance with the present invention. A method derived from the use of simple wave regions offers one such approach and can be used to derive a channel profile as indicated in FIG. 4.

Figure 4:
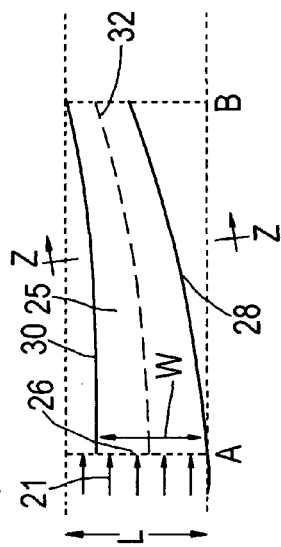
FIG. 4 is a developed view showing a scavenge channel extending between points A and B as indicated on FIG. 3.

FIG. 4 illustrates one possible profile of a scavenge channel 25, open to the chamber, in accordance with the present invention, effectively showing the channel from above, as if looking in a radial direction from the axis 18 of the chamber illustrated in FIG. 3. As indicated in FIG. 4, the channel is elongate and has an inlet end 26 (at position A), and an outlet end 27 (at position B). As will be appreciated by comparison with FIG. 3, the inlet end 26 precedes the outlet 27 in the direction of rotation 19 of the shaft 17.

In the arrangement illustrated in FIG. 4, the inlet end 26 has a width w which is equal to the length L of the chamber 15, and so the inlet end 26 of the channel 25 runs substantially the entire length of the chamber.

One side of the channel 25 is defined by a concave sidewall 28 which presents a curved compression surface to the primary flow 21 of oil, and which, for the purpose of analysis, can be approximated by a series of straight line segments— where the discretised surface is assumed to generate an almost continuous series of weak compression waves. In the arrangement illustrated in FIG. 4, the opposite side of the channel 25 is defined by a substantially straight sidewall 29, effectively formed by the end-wall of the chamber 15.

Figure 5:
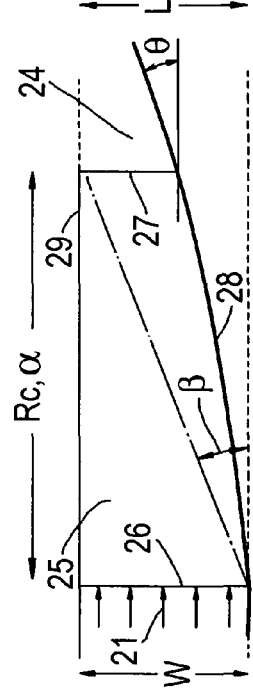
FIG. 5 is a view generally similar to that of FIG. 4, showing another scavenge channel in accordance with the present invention.

FIG. 5 illustrates a variation of the channel profile shown in FIG. 4, in which the width of the channel w at the inlet end 26 is less than the length L of the chamber. Also, it can be seen that the channel 25 depicted in FIG. 5 has a convex curved sidewall 30 along the side of the channel opposite to the concave sidewall 28. As will be explained in more detail below, the convex sidewall 30 defines a curved cancellation surface to the primary flow of oil, opposite to the curved compression surface defined by the sidewall 28.

As will be appreciated from FIG. 5, the part of the primary flow 21 moving down the chamber wall outside the reduced-width inlet 26 to the channel will subsequently enter the channel 25 by falling over the curved sidewall 30. It has been found that although this part of the primary flow is not decelerated in the same manner as the rest of the primary flow 21 which enters the channel 25 through the inlet 26, the effect on wave generation is minimal and acceptable.

For an 'equivalent' inlet Froude number of approximately 3, the turning angle (i.e. the angle between a tangents to the concave sidewall 28 at the outlet end 27 and at the inlet end, as denoted by θ in FIG. 4) required of the compression surface to reach critical conditions is approximately 30°.

In gas turbine bearing chamber applications, it is desirable to minimise the length of the supercritical section (A-B), and hence the length of the scavenge channel 25, consistent with minimising the likelihood of strong wave generation. The minimum length solution approaches (but retains some margin relative to) that corresponding to a centred wave. The use of a minimum length channel for supercritical deceleration is more in line with supersonic air intake practice than conventional civil engineering hydraulics practice where turning and not necessarily deceleration of supercritical flow is primarily of interest in practical applications.

For gas turbine bearing chamber applications, the chamber 15 is generally rather short in length, as will be appreciated from FIG. 4, with the geometric parameter $L/R_c$ typically being in the range 0.5 to 1.0, Hence, the minimum angular length, α1, of the scavenge channel 25 is approximately 50 to 100° meaning that the channel extends over approximately 15 to 25% of the chamber circumference.

In a typical gas turbine arrangement, there are practical restrictions on where the scavenge pipe 23 can be located around the circumference of the chamber, which has a knock-on effect on where the start point A of the supercritical deceleration section can be located. Typically, the scavenge pipe 25 must be located so as to pass through one of a limited number of vanes specifically designated for the passage of service pipes and which form part of a stator assembly around the chamber 15. Within these constraints, the preferred arrangement of the present invention is configured such that the inlet 24 to the scavenge pipe 25 is located within 90° past the bottom-dead-centre (BDC) point in order to ensure that the counterflow 22 of shed oil is reliably scavenged.

It has been found that in order to minimise the potential for strong wave formation within the channel 25, the shape of the compression surface defined by the curved sidewall 28 should be chosen to possess zero curvature at the beginning and end of the supercritical section (i.e. at A and B) which means that the concave sidewall 25 is preferably configured to have regions of zero curvature at the inlet end 26 and the outlet end 27.

It has also been found that a concave sidewall 25 having a cosine profile is particularly effective in decelerating the supercritical primary flow without generating waves, although it should be appreciated that other curves could also be used. The corresponding simple wave flowfield is calculated using hydraulic theory in a stepwise manner to a Froude number of approximately 1.1. Streamline tracing can be used to find the geometry of the opposite wave cancellation surface as defined, for example, by the convex sidewall 30 of the arrangement shown in FIG. 5.

Figure 6:
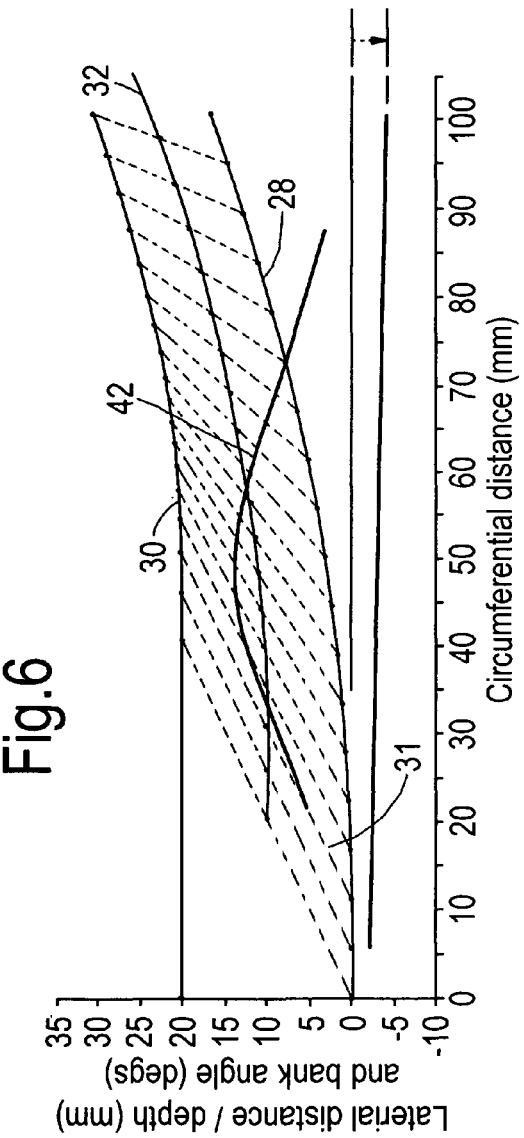
FIG. 6 shows the scavenge channel of FIG. 5 in more detail.

If it is found that neighbouring compression waves (indicated by dashed lines at 31 in FIG. 6), resulting from the primary flow impinging on the curved compression surface 28, intersect before reaching the opposed cancellation surface 30, then it becomes necessary to revise the profile or length of the compression surface 30 until no intersection occurs. This redesign minimises the potential for reinforcement of the weak compression waves 31 into higher strength waves. Reinforcement would give an unacceptably abrupt, and undesirable, increase in flow depth. A typical calculated geometry for the compression and cancellation surfaces and waves is shown in FIG. 6, where the mid-point streamline of the flow is denoted by 32.

Having defined the profiles of the sidewalls 28, 30 of the channel 25 (and hence the compression and cancellation surfaces), the 3D geometry of the channel can be defined. For the purpose of illustration, a simplified method for this process is based on analysis of the mid-point streamline 32, although a more comprehensive analysis can be conducted through consideration of multiple streamlines dispersed laterally across the width of the channel.

Figure 7:
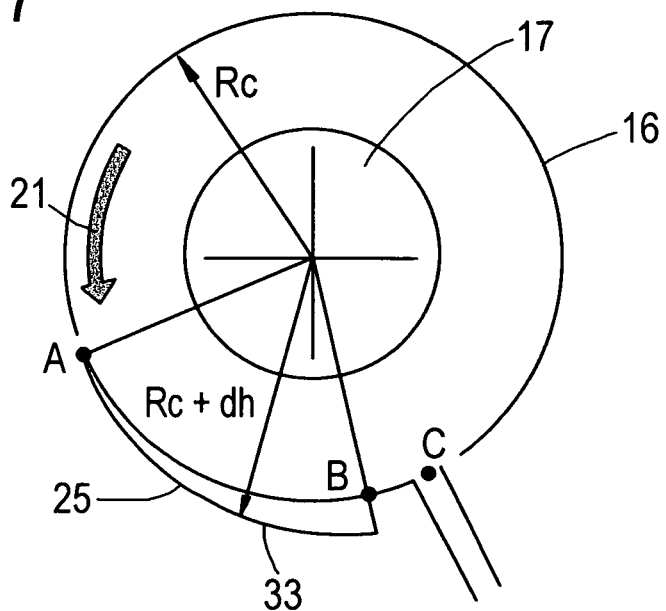
FIG. 7 is another schematic transverse cross-sectional view of the chamber, showing the variation in depth of the scavenge channel of an embodiment of the present invention.

As will be appreciated, as the primary flow 21 is decelerated within the channel 25, its depth will tend to increase and so the depth of the channel 25, measured in a substantially radial direction with respect to the axis 18 of the chamber is configured to increase along the channel in order to accommodate the decelerating flow. It has been found that the ideal ratio of channel depth in the region of the outlet end 27 to channel depth at the inlet end 26 is approximately 4. This means that with an initial film depth at point A of 1 to 2 mm, the film depth at point B will be approximately 4 to 8 mm. The bottom surface 33 of the channel is thus displaced radially outwardly by an amount equal to the local increase in film thickness predicted along the midpoint streamline 32, as illustrated schematically in FIG. 7. Line 33 shown on FIG. 7 shows the depth variation of the channel 25 along the mid-point streamline 32.

Figure 8:
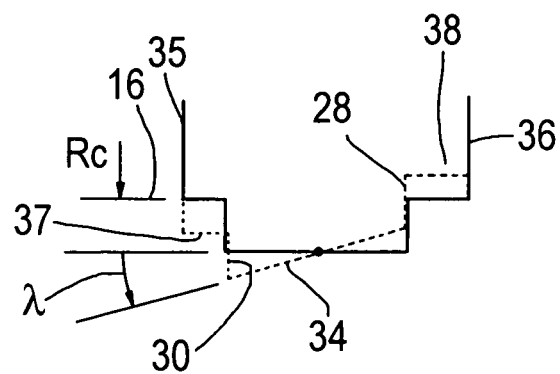
FIG. 8 is a cross-sectional view through the scavenge channel illustrated in FIG. 5, taken along line Z-Z.

To ensure that the flow of oil through the channel 25 does not experience lateral inertial forces due to is curved path, the channel 25 is configured to have a banked profile. FIG. 8 illustrates the banked profile of the channel in dotted-lines at one point along the length of the channel, with the un-banked profile shown in solid lines for comparison (the end walls of the chamber being shown at 35 and 36). As can be seen, the bottom surface 34 of the channel is banked so to make an acute angle λ to the adjacent region of the chamber wall. Banking the bottom 34 of the channel in this manner may necessitate increasing the local radius of the chamber, at 37, in the region of the cancellation surface 30, and decreasing the local radius of the chamber, at 38, in the region of the compression surface.

The bank angle λ required to offset the centrifugal force is related to the local (lateral) radius of curvature and velocity of the flow. In the approximate method, the local bank angle λ is evaluated at intervals along the midpoint streamline 32. With a compression surface 28 having a cosine deflection profile, the bank angle preferably tends to zero at the inlet end 26 and the outlet end 27 on the scavenge channel 25. Line 42 in FIG. 6 illustrates the variation in lateral bank angle λ along the mid-point streamline 32.

Turning now to consider in more detail the configuration of the subcritical section B-C of the scavenge arrangement of the present invention, it is to be appreciated that at the outlet end 27 of the open channel 25 of the supercritical section A-B, the flow of oil is approximately critical and substantially one-dimensional. The subcritical section B-C serves to turn this incoming flow smoothly into the inlet 24 of the scavenge pipe 23. Also, it is preferred that the geometry of the subcritical section B-C should be configured so as to allow substantially unrestricted entry of the counter flow 22 into the scavenge pipe inlet 24.

FIGS. 9, 10 and 11, 12 illustrate two alternative forms of subcritical sections, both of which comprise a generally bowl-shaped funnel recess 39 provided in the chamber wall 16 at the end of the open scavenge channel 25. In both arrangements the funnel recess 39 is directly fluidly connected to the outlet end 27 of the channel 25, and has a substantially radially outwardly directed outlet 40 for fluid connection to the scavenge pipe.

Figure 9:
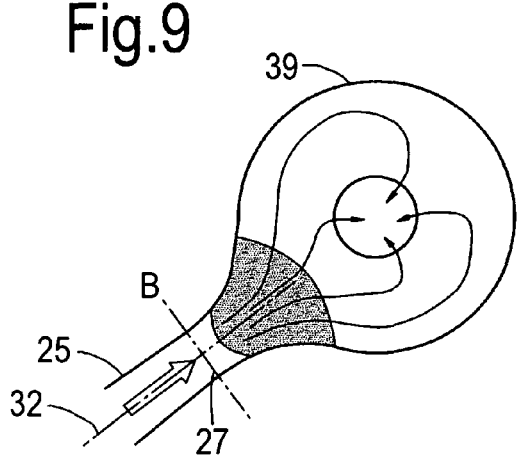
FIG. 9 shows a funnel recess formed at the end of a scavenge channel in accordance with one embodiment of the present invention.
Figure 10:
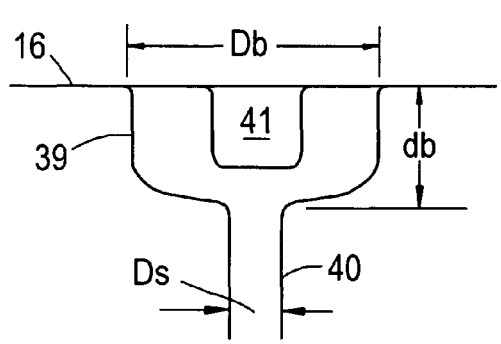
FIG. 10 is a transverse cross-sectional view showing the funnel recess of FIG. 9.

FIGS. 9 and 10 show an arrangement in which the funnel recess 39 is substantially circular in form and arranged so as to be symmetrical about the mid-point streamline 32 of the flow exiting the channel 25. The outlet end 27 of the channel is connected to an opening 41 provided in the upper region of the funnel recess 39.

As will be appreciated, the precise design on the funnel recess 39 is rather less critical than the design of the channel 25, given that the funnel recess handles subcritical flow only. However, it is preferred that the depth of the recess should be no less than the depth of the channel 25 at the outlet end 27, and abrupt changes in depth and/or section profile should be avoided.

Assuming that the diameter of the scavenge pipe is sized such that the bulk velocity of the scavenged oil flow does not exceed a specified value, and also that the flow weirs around the full perimeter of the scavenge pipe inlet as defined by the funnel recess, a suitable recess depth, db, can be calculated by:

$$\frac{db}{Ds} = \sqrt[3]{\frac{Us^2}{16 \cdot Ds \cdot g}}$$

Where:
db=funnel depth
Ds=bore of scavenge pipe (at inlet)
Us=bulk velocity of scavenged oil used to size scavenge pipe
g=acceleration due to gravity For typical gas turbine bearing chamber applications, and assuming the scavenge pipe 25 is sized to correspond to Us~1.5 m/s, then db/Ds is approximately 1.

Empirical results suggest that the minimum diameter, Db, of the bowl-shaped funnel recess should be approximately 3 times that of the basic scavenge pipe diameter, Ds.

A large diameter recess readily allows the counter flow to fall into the recess 39, by presenting a large weir perimeter. It also helps promote a steady weir-type flow into the scavenge pipe itself, (i.e reducing the probability of undesirable 'slugging' flow at the inlet) by increasing the tendency for the flow to be radially symmetric about the scavenge pipe inlet.

Figure 11:
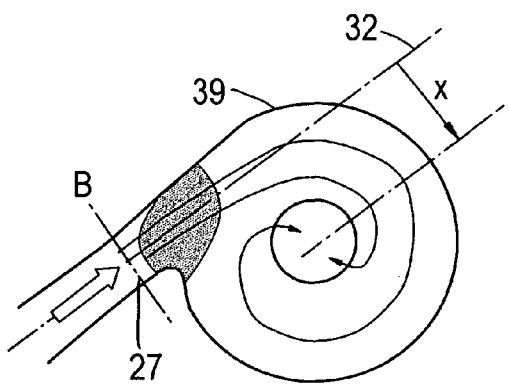
FIG. 11 shows an alternative funnel recess at the end of a scavenge channel in accordance with an alternative embodiment of the present invention.
Figure 12:
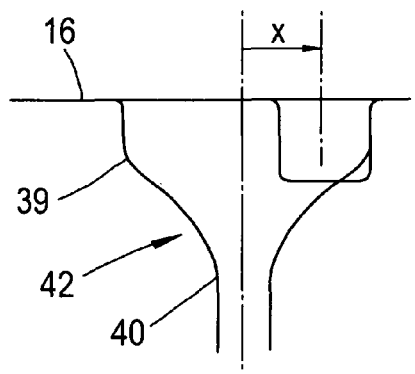
FIG. 12 is a transverse cross-sectional view showing the funnel recess of FIG. 11.

FIGS. 11 and 12 illustrate an alternative arrangement in which the funnel recess 39 is laterally offset from the outlet end 27 of the scavenge channel 25. As can be seen, the centre of the scavenge pipe inlet is laterally offset from the direction of the mid-point streamline by a distance x. Lateral offset between the channel 25 and the funnel recess 39 in this way may be used to promote swirl in the bowl of the funnel recess. This has the advantage of promoting a more radially uniform weiring flow at the expense of a slightly greater bowl depth requirement to contain the additional centrifugal head. This latter effect may be offset to some extent by increasing the radius at the inlet to the scavenge pipe, resulting in a smoother transition between the bowl and the scavenge pipe, in the region indicated generally at 42 in FIG. 12.

With an offset funnel recess 39 of the type illustrated generally in FIGS. 11 and 12, the remaining kinetic energy in the oil builds up a rotating film on the inner wall of the bowl. Ideally the film swirls from the inlet of the bowl (B) within one rotation around the bowl into the scavenge pipe 25. A homogenous film on the wall is generated, which stays attached to the pipe inner wall of the pipe. The air entrainment into the scavenge pipe 25 and therefore into the oil is thus reduced and any discontinuous/unsteady 'gulping' effect highly reduced.

Figure 13:
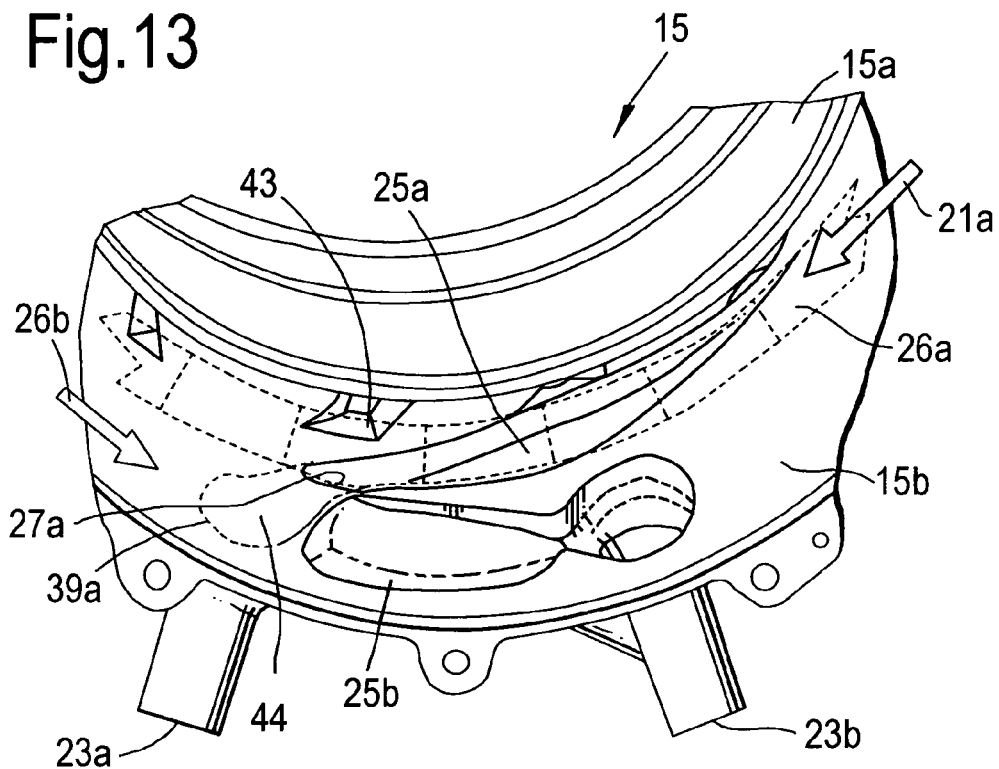
FIG. 13 is a perspective view showing the inside of a region of a chamber incorporating a scavenge arrangement in accordance with the present invention.
Figure 14:
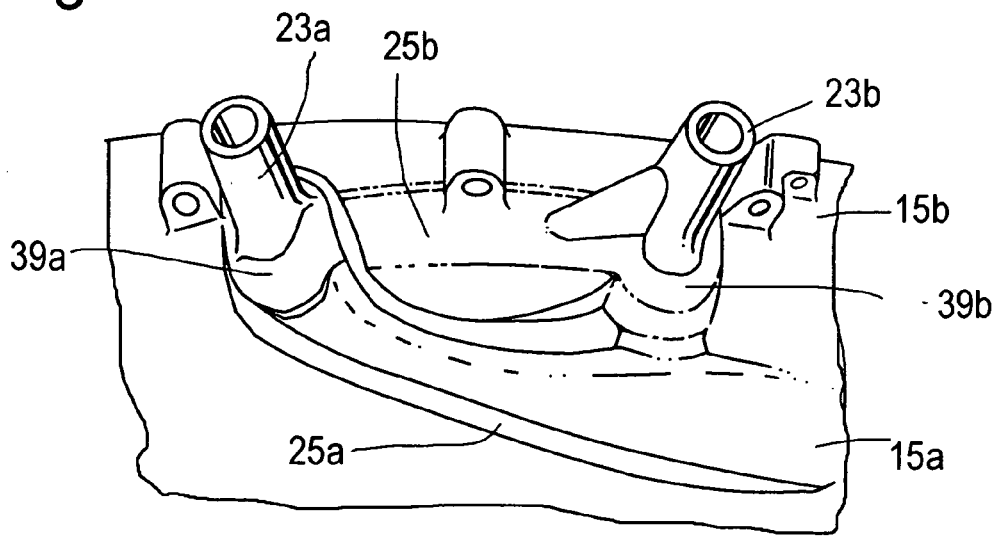
FIG. 14 is a perspective view showing the outside of the chamber region shown in FIG. 13.

FIGS. 13 and 14 shown an example of a gas turbine bearing chamber having two discrete scavenge channels in accordance with the present invention, shown as channels 25a and 25b. FIG. 13 shows the channels from inside the chamber, and FIG. 14 shows the channels from outside the chamber.

The chamber 15 illustrated in FIGS. 13 and 14 is a bearing chamber of a gas turbine engine which is configured to house two contra-rotating shafts (not shown). As such, the chamber is internally divided, by a low annular wall 43 (indicated in phantom in FIG. 13), into two chamber sections 15a, 15b. The primary flow within chamber section 15a is indicated generally by arrow 21a and is generated by rotation of one of the shafts, whilst the primary flow within the other chamber section 15b is indicated generally by arrow 21b and is generated by rotation of the other shaft, in the opposite direction. The function of the low annular wall 43 is to keep the two primary flows 21a, 21b separate from one another.

The first scavenge channel 25a, provided within chamber section 15a, is intended decelerate the first primary flow 21a and to direct the flow away from the chamber through a first scavenge pipe extending generally radially outwardly from the chamber. In the arrangement illustrated, practical limitations on where the scavenge pipe 23a can be located mean that the pipe is laterally offset from the inlet end 26a, and indeed also from the outlet end 27a of the first channel 25a. In order to accommodate this offset, and as most clearly illustrated in FIG. 14, the channel 25a itself is highly curved, and the recess funnel 39a is of the asymmetric laterally offset design shown in FIGS. 11 and 12.

Also, because of the lateral limitations on siting the scavenge pipe 23a, it can be seen that the pipe 23a actually extends radially outwardly from the chamber in the region of the second chamber section 15b rather than the first chamber 15a whose primary flow it handles. This necessitates the provision of a closed funnel recess 39a on the outlet end of the scavenge channel 25a, having a cover 44. Whilst this type of arrangement will impede the inflow of any counter flow within the first chamber section 15a into the scavenge pipe 23a, it will ensure that the decelerated primary flow through the channel 25a will not interfere with the primary flow 21b entering the channel 25b of the neighbouring chamber section 15b.

Because the scavenge pipe 23b of the second channel 25b can be located within the lateral confines of the second chamber section 15b, then second channel 25b does not need to be offset in the same manner as the first channel 25a. Accordingly, it can be seen that the second channel is not significantly laterally curved and has a funnel section 39b of symmetric design generally similar to that illustrated in FIGS. 9 and 10.

Figure 15:
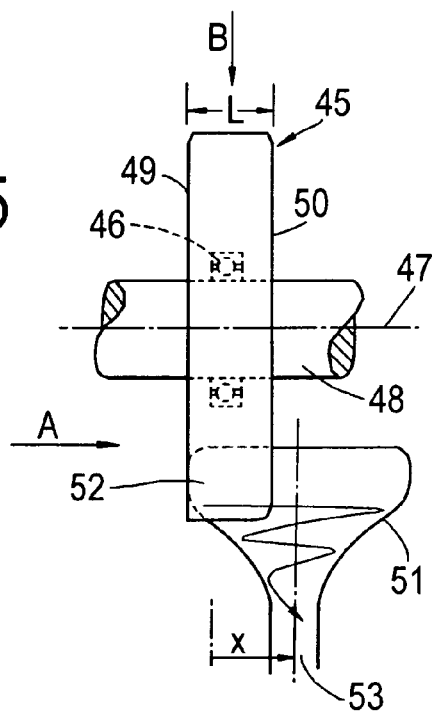
FIG. 15 is a part-sectional side view showing a gas turbine bearing chamber in accordance with an alternative embodiment.
Figure 16:
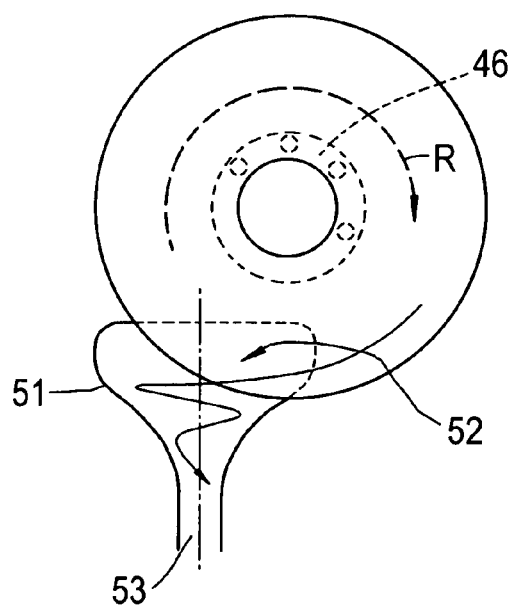
FIG. 16 is part-sectional end view of the arrangement shown in FIG. 15, viewed from the direction indicated by arrow A in FIG. 15.
Figure 17:
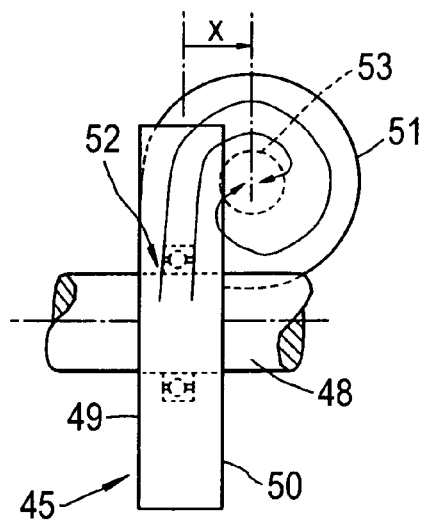
FIG. 17 is a part-section view from above of the arrangement shown in FIG. 15, viewed from the direction indicated by arrow B in FIG. 15.

Whilst the invention has been described above with reference to specific embodiments comprising both a supercritical channel section (section A-B), and a subcritical section (section B-C), it should be noted that in some gas turbine bearing chamber arrangements sufficient oil scavenging may be provided by using a subcritical section (B-C) on its own, without a preceding supercritical channel section. An exemplary arrangement of this type is shown in FIGS. 15 to 17, which illustrate a bearing chamber 45 viewed from the side in FIG. 15, one end in FIG. 16, and above in FIG. 17.

The bearing chamber 45 houses a high-speed bearing 46 which is continuously supplied with a liquid lubricant and which is mounted for rotation (in the direction indicated by arrow R in FIG. 16) about an axis 47, to support a rotating shaft 48 of a gas turbine engine. As can be seen from FIG. 15 in particular, the bearing chamber is relatively short in length (L) extending between its two opposed end walls 49, 50.

A swirl chamber 51 is provided, which extends outwardly from the bearing chamber 45 so as to be both axially and laterally offset from the bearing chamber 45. As shown in FIGS. 15 and 16, the swirl chamber 51 is preferably generally funnel-shaped, so to have a similar internal configuration to the funnel recess 39 illustrated in FIGS. 11 and 12.

The swirl chamber 51 is provided in direct fluid communication with the bearing chamber 45 via a relatively large mouth region (indicated generally at 52) which is open to the interior of the bearing chamber 45 along substantially the entire length L of the bearing chamber 45, and a significant proportion of the diameter of the swirl chamber 51. The swirl chamber 51 has a substantially radially outwardly directed outlet 53 for connection to a scavenge pipe in generally the same manner as in the case of the funnel recess 39 shown in FIGS. 11 and 12. The outlet 53 is offset from the bearing chamber 45 by a distance x measured between the midpoint of the bearing chamber (along its length L) and the centreline of the outlet 53.

It will therefore be appreciated that oil shed from the bearing 46 rotating within the bearing chamber 45 will flow as a thin film along the interior wall of the bearing chamber 51, so as to enter the mouth 52 of the swirl chamber, whereupon the offset configuration of the swirl chamber will impart a swirling motion to the oil flow, thereby improving its transfer to the scavenge pipe via the outlet 53.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A lubricant scavenge arrangement provided on a chamber having an outer wall and configured to house a lubricated rotative component for rotation about an axis, the scavenge arrangement by comprising:
   a substantially elongate channel provided in a substantially arcuate region of the outer wall, the channel being open to the chamber over substantially its entire length between an inlet end and an outlet end, said inlet end and said outlet end being angularly spaced apart around said axis, wherein
   the channel has a bottom surface which is banked so as to make an acute angle to the adjacent region of the chamber outer wall, and
   the angle at which the bottom surface of the channel is banked varies along the length of the channel.

2. A lubricant scavenge arrangement according to claim 1, wherein said inlet end precedes said outlet end in the direction of rotation of the rotative component within the chamber.

3. A lubricant scavenge arrangement according to claim 1, wherein said inlet end and said outlet end are angularly spaced apart by 50° to 100°.

4. A lubricant scavenge arrangement according to claim 1, wherein the channel is tapered such that its width, measured in a direction substantially parallel to the axis, narrows towards the outlet end.

5. A lubricant scavenge arrangement according to claim 4, wherein the width of the channel at the inlet end is substantially equal to the length of the chamber.

6. A lubricant scavenge arrangement according to claim 4, wherein the width of the channel at the inlet end is less than the length of the chamber.

7. A lubricant scavenge arrangement according to claim 1, wherein the channel has a substantially concave sidewall.

8. A lubricant scavenge arrangement according to claim 7, wherein the concave sidewall is configured to have regions of zero curvature at the inlet end and at the outlet end.

9. A lubricant scavenge arrangement according to claim 7, wherein the concave sidewall has a cosine profile.

10. A lubricant scavenge arrangement according to claim 7, wherein a tangent to the concave sidewall at the outlet end of the channel makes an angle of approximately 30° to a tangent to the concave sidewall at the inlet end of the channel.

11. A lubricant scavenge arrangement according to claim 1, wherein the channel has a substantially convex sidewall.

12. A lubricant scavenge arrangement according to claim 11, wherein a concave side wall is provided along one side of the channel and the convex side wall is provided along the opposite side of the channel.

13. A lubricant scavenge arrangement according to claim 1, wherein the outlet end of the channel is laterally offset with respect to the inlet end of the channel.

14. A lubricant scavenge arrangement according to claim 1, wherein the depth of the channel measured in a substantially radial direction with respect to the axis increases with movement along the channel from the inlet end to the outlet end.

15. A lubricant scavenge arrangement according to claim 14, wherein the ratio of channel depth in the region of the outlet end to channel depth in the region of the inlet end is approximately 4.

16. A lubricant scavenge arrangement according to claim 1, wherein the bank angle tends to zero at the inlet end and the outlet end of the channel.

17. A lubricant scavenge arrangement according to claim 1, wherein the outlet end of the channel is directly fluidly connected to a funnel recess provided in the chamber outer wall, the funnel recess having a substantially radially outwardly directed funnel-outlet for fluid connection to a scavenge pipe.

18. A lubricant scavenge arrangement according to claim 17, wherein the funnel recess is open to the chamber.

19. A lubricant scavenge arrangement according to claim 17, wherein the funnel-outlet is laterally offset relative to the outlet end of the channel.

20. A lubricant scavenge arrangement according to claim 17, wherein the funnel recess takes the form of a substantially circular bowl.

21. A lubricant scavenge arrangement according to claim 17, wherein the maximum diameter of the bowl is approximately three times the diameter of the funnel-outlets.

22. A gas turbine engine comprising a chamber having a lubricant scavenge arrangement according to claim 1.

23. A gas turbine engine according to claim 22, in which the chamber houses a pair of lubricated rotative components mounted for contra-rotation about an axis of the chamber, the lubricant scavenge arrangement comprising a pair of said channels, each channel being associated with a respective rotating component, and being oriented such that its inlet end precedes its outlet end in the direction of rotation of the respective rotative component.

* * * * *